(12) United States Patent
Terada et al.

(10) Patent No.: US 10,239,424 B2
(45) Date of Patent: Mar. 26, 2019

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Sho Terada, Aichi-ken (JP); Sonjin Kim, Aichi-ken (JP); Takahiro Asai, Aichi-ken (JP); Shinichiro Tajima, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/618,722

(22) Filed: Jun. 9, 2017

(65) Prior Publication Data

US 2017/0355286 A1 Dec. 14, 2017

(30) Foreign Application Priority Data

Jun. 10, 2016 (JP) .................................. 2016-116435

(51) Int. Cl.
*B60N 2/28* (2006.01)
*B60N 2/60* (2006.01)
(Continued)

(52) U.S. Cl.
CPC ........... *B60N 2/289* (2013.01); *B60N 2/5825* (2013.01); *B60N 2/5841* (2013.01); *B60N 2/6009* (2013.01); *B60N 2/70* (2013.01)

(58) Field of Classification Search
CPC .... B60N 2/289; B60N 2/2887; B60N 2/2893; B60N 2/68
(Continued)

(56) References Cited

U.S. PATENT DOCUMENTS 7,338,121 B1 3/2008 Pilcher
7,533,934 B2 5/2009 Foelster et al.
(Continued)

FOREIGN PATENT DOCUMENTS

FR 3011207 4/2015
JP 2001-277920 10/2001
(Continued)

OTHER PUBLICATIONS

U.S. Appl. No. 15/618,635 to Sho Terada et al., filed Jun. 9, 2017.
(Continued)

*Primary Examiner* — Milton Nelson, Jr.
(74) *Attorney, Agent, or Firm* — Greenblum & Bernstein, P.L.C.

(57) ABSTRACT

A vehicle seat includes a seat pad configured to support an occupant and having a through-hole extending through the seat pad in a direction from an occupant sitting side toward a side opposite to the occupant sitting side; and a frame member attached to an opening end of the through-hole on the occupant sitting side, the frame member having an opening configured such that a fixation connecting portion of a child safety seat is inserted into the opening. The frame member is provided with an attaching portion attached to the seat pad. The seat pad includes an attachment pad portion provided integrally with an attachment member including an attachment portion to which the attaching portion of the frame member is attached, the attachment pad portion constituting a part of an inner wall surface of the through-hole. The attaching portion is fixed to the attachment portion with a fixing member.

12 Claims, 6 Drawing Sheets

(51) Int. Cl.
*B60N 2/58* (2006.01)
*B60N 2/70* (2006.01)

(58) Field of Classification Search
USPC .............................................. 297/452.18, 253
See application file for complete search history.

(56) References Cited

U.S. PATENT DOCUMENTS

| | | | |
|---|---|---|---|
| 9,656,577 B2 * | 5/2017 | Sekino | ................. B60N 2/6009 |
| 9,738,183 B2 * | 8/2017 | Szlag | ....................... B60N 2/58 |
| 2003/0160485 A1 | 8/2003 | Mullen et al. | |
| 2004/0080195 A1 | 4/2004 | Adams et al. | |
| 2004/0227384 A1 | 11/2004 | Smallwood et al. | |
| 2015/0084388 A1 | 3/2015 | Arai et al. | |
| 2016/0200224 A1 | 7/2016 | Fujikake et al. | |
| 2016/0250948 A1 | 9/2016 | Sekino et al. | |
| 2018/0056820 A1 | 3/2018 | Sammons | |
| 2018/0056821 A1 | 3/2018 | Konrad | |

FOREIGN PATENT DOCUMENTS

| | | | | |
|---|---|---|---|---|
| JP | 2004149091 A * | 5/2004 | ........... | B60N 2/6009 |
| JP | 2010-64636 | 3/2010 | | |
| JP | 5722172 B2 * | 5/2015 | ............... | B60N 2/58 |

OTHER PUBLICATIONS

Office Action issued in United States Counterpart U.S. Appl. No. 15/618,635, dated Oct. 18, 2018.

* cited by examiner

VEHICLE SEAT

INCORPORATION BY REFERENCE

The disclosure of Japanese Patent Application No. 2016-116435 filed on Jun. 10, 2016 including the specification, drawings and abstract is incorporated herein by reference in its entirety.

BACKGROUND

1. Technical Field

The disclosure relates to a vehicle seat.

2. Description of Related Art

There has been known a vehicle seat including a seat pad that supports an occupant, a through-hole formed so as to extend through the seat pad in a direction from an occupant sitting side to a side opposite to the occupant sitting side, and a frame member attached to an opening end of the through-hole on the occupant sitting side (see French Patent Application Publication No. 3011207). The frame member has an opening configured such that a fixation connecting portion (connector) of a child safety seat for ISOFIX is inserted into the opening. The ISOFIX is the international standard of a method for fixing a child safety seat to a vehicle.

SUMMARY

However, the vehicle seat described in French Patent Application Publication No. 3011207 is formed as follows. In a state where the frame member is attached to a wire member, a seat pad is formed around the wire member, for example, by foaming urethane foam or the like, and then, the frame member is attached to a locking member. Thus, the attachment of the frame member is complicated.

The disclosure provides a vehicle seat in which a frame member is easily attached with a simple structure.

An aspect of the disclosure relates to a vehicle seat. The vehicle seat includes a seat pad configured to support an occupant, the seat pad having a through-hole provided so as to extend through the seat pad in a direction from an occupant sitting side toward a side opposite to the occupant sitting side; and a frame member attached to an opening end of the through-hole on the occupant sitting side, the frame member having an opening configured such that a fixation connecting portion of a child safety seat is inserted into the opening. The frame member is provided with an attaching portion attached to the seat pad. The seat pad includes an attachment pad portion provided integrally with an attachment member including an attachment portion to which the attaching portion of the frame member is attached, the attachment pad portion constituting a part of an inner wall surface of the through-hole. The attaching portion of the frame member is fixed to the attachment portion of the attachment member with a fixing member.

In the vehicle seat, the attaching portion of the frame member is fixed, with the fixing member, to the attachment portion of the attachment member provided integrally with the attachment pad portion of the seat pad, the frame member having the opening configured such that the fixation connecting portion of the child safety seat for, for example, ISOFIX is inserted into the opening. That is, the frame member is attached to the attachment pad portion of the seat pad, which has been formed integrally with the attachment member. Therefore, for example, it is not necessary to form the seat pad during the attachment of the frame member, unlike the related art, and the frame member can be easily attached. Thus, with a simple structure, the attachment of the frame member in the vehicle seat is easily performed.

In the vehicle seat according to the above aspect, a wire member to which the attachment member is attached may be embedded in the attachment pad portion. In this case, it is possible to easily attach the frame member to the attachment pad portion in which the wire member is embedded. Further, it is possible to sufficiently fix the frame member to the attachment member attached to the wire member. Note that a part of the wire member may be exposed to the outside of the attachment pad portion, provided that at least a part of the wire member is embedded in the attachment pad portion.

The frame member may include a frame body portion having the opening, and an attachment extension portion extending from the frame body portion toward the seat pad, the attachment extension portion including the attaching portion. In this case, the attachment of the frame member in the vehicle seat is further easily performed.

In the frame member, the attachment extension portion may have a recessed portion that is recessed toward the attachment member, and the attaching portion may be provided in the recessed portion. In this case, a fixing portion (e.g., the fixing member or the like) provided to fix the attaching portion of the frame member to the attachment portion of the attachment member can be prevented from being exposed to the outside (in other words, a fixing portion, at which the attaching portion of the frame member and the attachment portion of the attachment member are fixed, can be prevented from being exposed to the outside). This makes it possible to improve external appearance and a design property.

In the frame member, the attachment extension portion may include an attachment locking portion locked to the attachment pad portion. In this case, the positioning of the frame member is easily performed, and thus, the attachment of the frame member in the vehicle seat is further easily performed.

The attachment portion of the attachment member may be covered with a covering material covering the seat pad. In this case, it is possible to prevent the attachment portion of the attachment member from being exposed to the outside. This makes it possible to improve the external appearance and the design property.

The covering material covering the attachment portion of the attachment member may be fixed, with the fixing member, to the attachment portion of the attachment member together with the attaching portion of the frame member. In this case, it is possible to cover the attachment portion of the attachment member with the covering material and to sufficiently fix the covering material to the attachment portion of the attachment member.

The seat pad may be a cushion pad disposed inside a seat cushion configured to support buttocks of the occupant. In this case, the frame member is easily attached to the seat cushion.

The cushion pad may include a pad body portion, and a pad projecting portion projecting from the pad body portion toward a seatback configured to support a back of the occupant, and the through-hole and the attachment pad portion may be provided in the pad projecting portion. In this case, the frame member is easily attached to the seat cushion.

The attaching portion of the frame member and the attachment portion of the attachment member, which are fixed with the fixing member, may be covered by the seatback. In this case, the fixing portion provided to fix the attaching portion of the frame member to the attachment portion of the attachment member can be prevented from being exposed to the outside (in other words, the fixing portion, at which the attaching portion of the frame member and the attachment portion of the attachment member are fixed, can be prevented from being exposed to the outside). This makes it possible to improve the external appearance and the design property.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
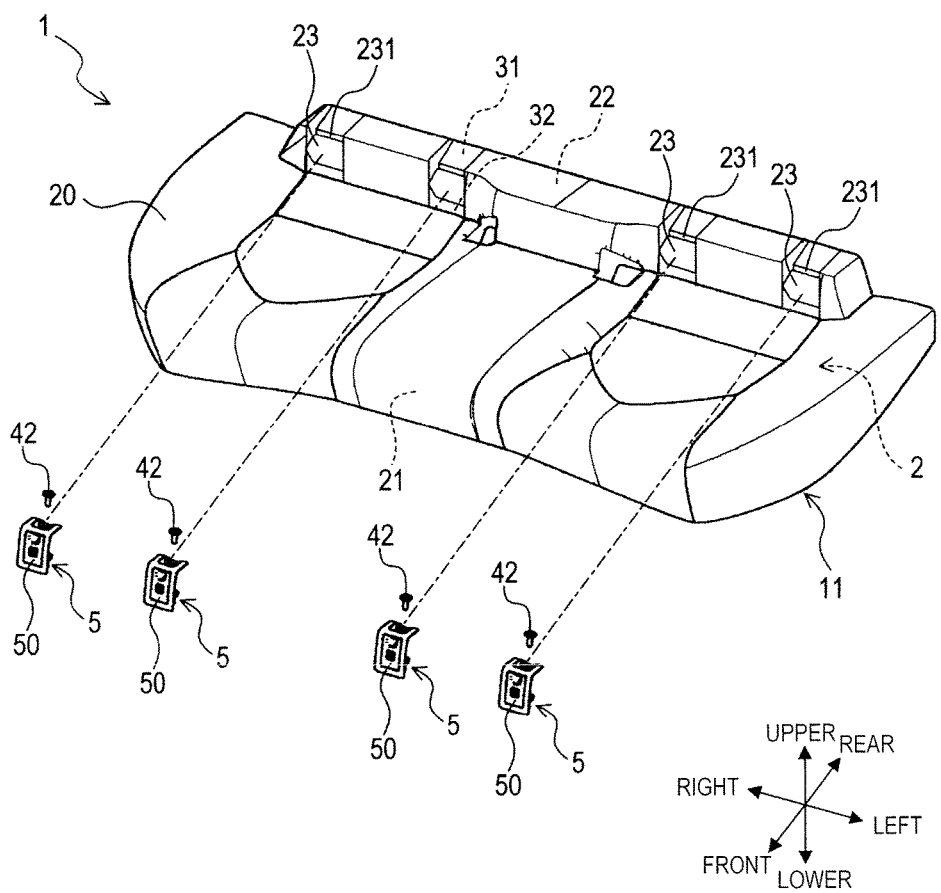
FIG. 1 is a perspective view illustrating a cushion seat of a vehicle seat.

An embodiment of the disclosure will be described with reference to the drawings. In the present embodiment, a vehicle seat of the disclosure is applied to a vehicle seat used for an automobile or the like.

Note that, in the present embodiment, arrows indicating directions toward an upper side, a lower side, a front side, a rear side, a right side, and a left side in the drawings are provided for easy understanding of the relationship between those drawings. The disclosure is not limited to the directions assigned in the drawings.

Figure 2:
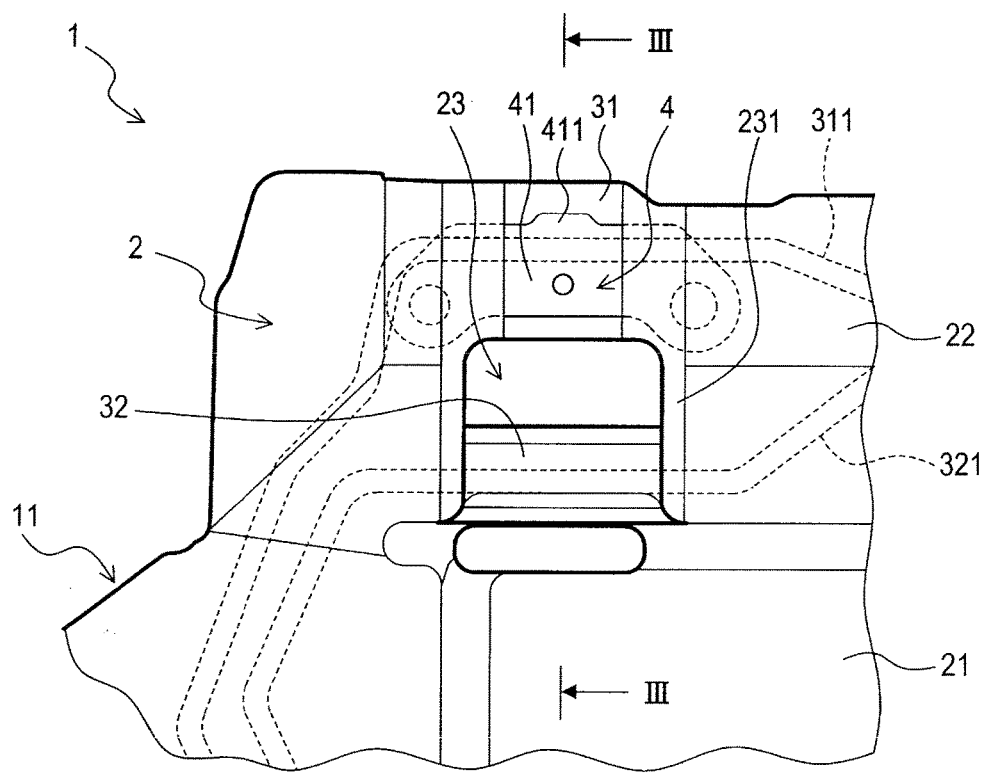
FIG. 2 is a plan view illustrating a pad projecting portion of a cushion pad.
Figure 3:
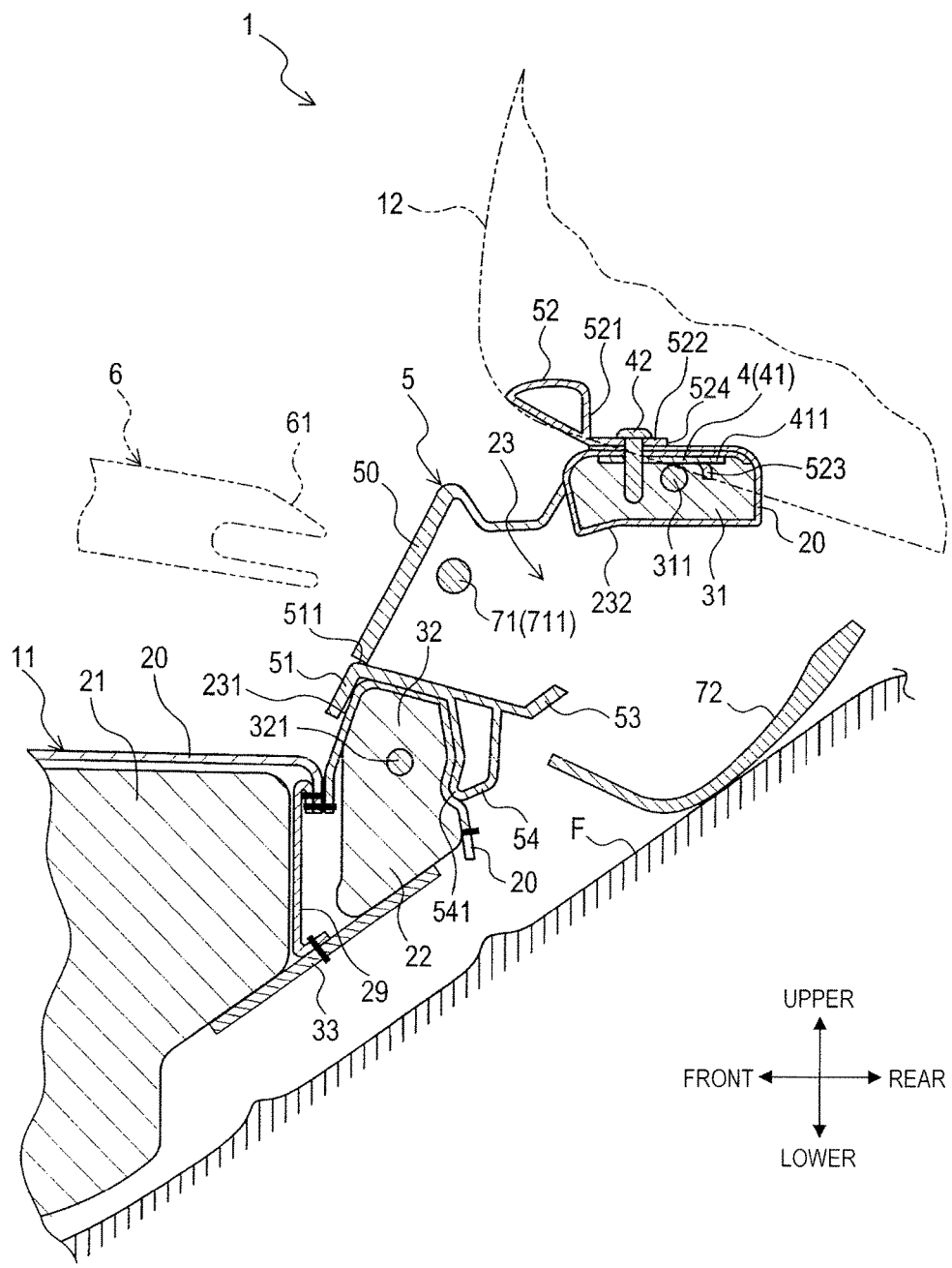
FIG. 3 is a sectional explanatory view taken along a line in FIG. 2.
Figure 4:
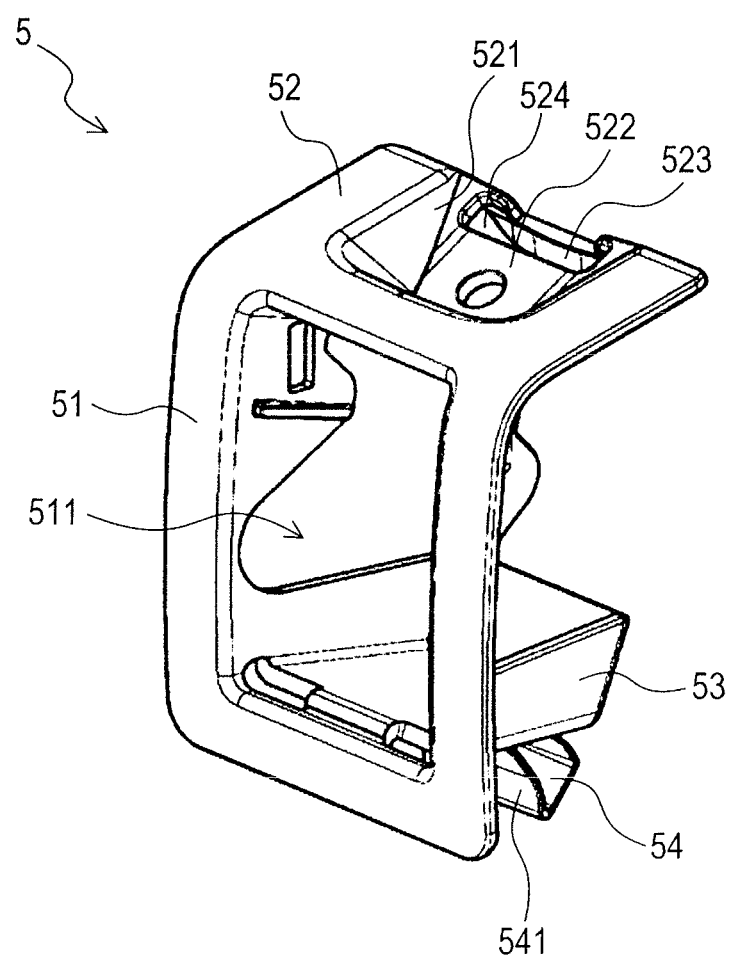
FIG. 4 is a perspective view of a bezel member when viewed from a front side.
Figure 5:
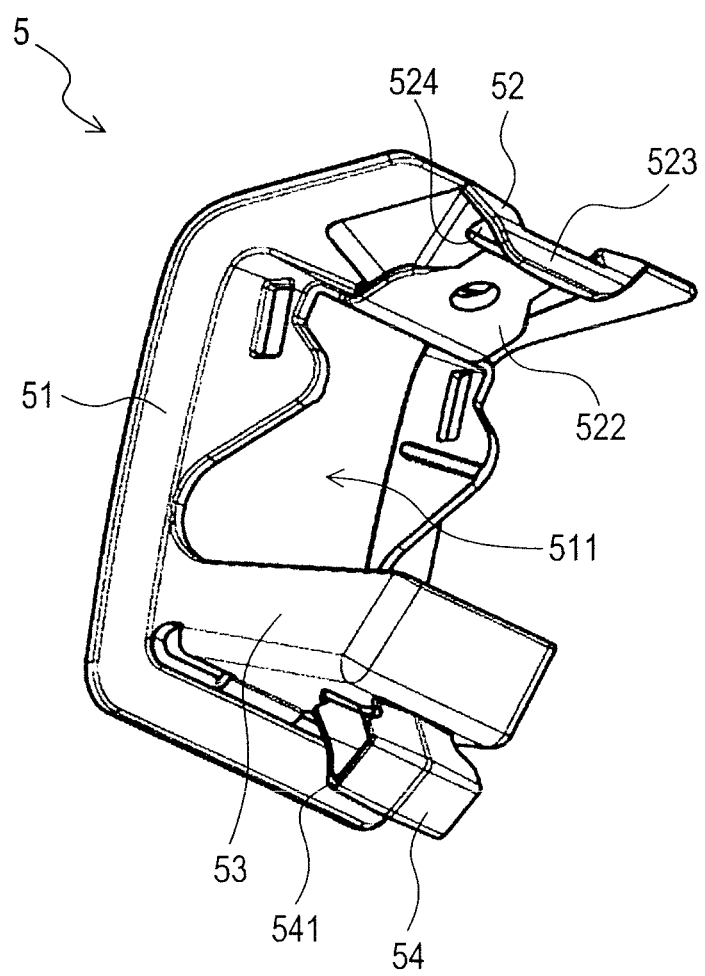
FIG. 5 is a perspective view of the bezel member when viewed from a rear side.

As illustrated in FIGS. 1 to 3, a vehicle seat 1 constituting a rear seat of a vehicle includes a seat cushion 11 that supports buttocks of an occupant; a seatback 12 that supports a back of the occupant; and a headrest (not shown) disposed on an upper side of the seatback 12 so as to support a head of the occupant.

The seat cushion 11 includes a cushion frame (not shown) forming a framework for the seat cushion 11; a cushion pad (a seat pad)² disposed inside the seat cushion 11 and attached to the cushion frame; and a covering material 20 covering a surface of the cushion pad 2.

The cushion pad 2 includes a pad body portion 21 serving as a sitting portion of the occupant; and a pad projecting portion 22 projecting upward from a rear end of the pad body portion 21 toward the seatback 12.

A pair of through-holes 23 on each of right and left sides, i.e., four through-holes 23 in total are formed in the pad projecting portion 22. Each through-hole 23 is formed so as to extend through the pad projecting portion 22 from an occupant sitting side (i.e., a front side, a forward side) toward a side (i.e., a back side, a rear side) opposite to the occupant sitting side. A bezel member (a frame member) 5 is attached to an opening end 231 of the through-hole 23 on the occupant sitting side.

The pad projecting portion 22 is provided with four attachment pad portions 31 to which the bezel members 5 are attached and fixed, and four locking pad portions 32 to which the bezel members 5 are locked. The attachment pad portion 31 is disposed so as to extend in a right-left direction in an upper side of the through-hole 23. The attachment pad portion 31 constitutes a part of an inner wall surface 232 of the through-hole 23. The locking pad portion 32 is disposed so as to extend in the right-left direction in a lower side of the through-hole 23. The locking pad portion 32 constitutes a part of the inner wall surface 232 of the through-hole 23.

A first wire member 311 is embedded inside the attachment pad portion 31. The first wire member 311 is disposed so as to extend in the right-left direction inside the attachment pad portion 31. A part of the first wire member 311 is exposed on a top face of the attachment pad portion 31. A plate-shaped attachment bracket (an attachment member) 4 is attached to the first wire member 311.

The attachment bracket 4 is joined, by welding or the like, to an exposed part of the first wire member 311, the exposed part being exposed on the top face of the attachment pad portion 31. The attachment bracket 4 is provided integrally with the attachment pad portion 31. The attachment bracket 4 includes an attachment portion 41 to which the bezel member 5 is attached and fixed. A protrusion 411 projecting rearward is provided in a rear end of the attachment portion 41.

The attachment pad portion 31 is covered with the covering material 20, as well as the other part of the cushion pad 2. The covering material 20 covering the attachment pad portion 31 is wound around the surface of the attachment pad portion 31. A top face of the attachment portion 41 of the attachment bracket 4 is covered with the covering material 20.

A second wire member 321 is embedded inside the locking pad portion 32. The second wire member 321 is disposed so as to extend in the right-left direction inside the locking pad portion 32. A part of the locking pad portion 32 is covered with the covering material 20, as well as the other part of the cushion pad 2.

As illustrated in FIGS. 1 to 5, the bezel member 5 includes a cover member 50, a frame body portion 51, an attachment extension portion 52, a locking extension portion 53, and a locking portion 54. The frame body portion 51 is formed in a quadrangular frame shape having a quadrangular opening 511. The frame body portion 51 is disposed so as to cover an opening edge, on the occupant sitting side, of the through-hole 23 of the pad projecting portion 22. The cover member 50 that closes the opening 511 is removably provided in the opening 511.

The attachment extension portion 52 is provided along the top face of the attachment pad portion 31 so as to extend from an upper end of the frame body portion 51 toward the rear side. The attachment extension portion 52 has a recessed portion 521 that is recessed toward the lower side (i.e., toward the attachment bracket 4). An attaching portion 522 attached to the attachment pad portion 31 is provided on a bottom face of the recessed portion 521. Further, a rear end of the attachment extension portion 52 is provided with an attachment locking lug portion (an attachment locking portion) 523 that is locked to the attachment pad portion 31 (more specifically, the attachment portion 41 of the attachment bracket 4 provided integrally with the attachment pad portion 31). A locking hole 524 through which the protrusion 411 of the attachment portion 41 of the attachment bracket 4 is passed is provided between the attaching portion 522 and the attachment locking lug portion 523.

The attaching portion 522 of the bezel member 5 is overlapped, in the up-down direction, with the attachment portion 41 of the attachment bracket 4 provided integrally with the attachment pad portion 31, and the attaching portion 522 is fastened and fixed to the attachment portion 41 with a fastening screw (a fixing member) 42. Further, the covering material 20 covering the attachment pad portion 31 is also fastened and fixed to the attachment portion 41 of the attachment bracket 4 with the fastening screw 42, together with the attaching portion 522 of the bezel member 5. The attaching portion 522 of the bezel member 5 and the attachment portion 41 of the attachment bracket 4, which are fastened and fixed with the fastening screw 42, are covered by the seatback 12 disposed above them, such that they are not exposed to the outside.

The locking extension portion 53 is provided along a top face of the locking pad portion 32 so as to extend from a lower end of the frame body portion 51 toward the rear side. The locking portion 54 is provided along a rear face of the locking pad portion 32 so as to extend from a rear end of the locking extension portion 53 toward the lower side. A lower end of the locking portion 54 is provided with a projecting lug portion (a projecting portion) 541 that projects toward the locking pad portion 32. The projecting lug portion 541 projects toward the second wire member 321 embedded in the locking pad portion 32.

The locking portion 54 of the bezel member 5 is locked to the locking pad portion 32. More specifically, the projecting lug portion 541 of the locking portion 54 is locked to the locking pad portion 32 from the rear side so as to be engaged with a rear face of the locking pad portion 32. An upper part of the locking pad portion 32 is disposed between the lower end of the frame body portion 51 and the locking portion 54 in the bezel member 5, so as to be sandwiched (held) in the front-rear direction between the lower end of the frame body portion 51 and the locking portion 54 in the bezel member 5.

A part of the covering material 20 covering the locking pad portion 32 is disposed between the locking pad portion 32, and the frame body portion 51, the locking extension portion 53, and the locking portion 54 of the bezel member 5. That is, a part of the covering material 20 covering the locking pad portion 32 is held between the locking pad portion 32 and the bezel member 5. One end of the covering material 20 covering the locking pad portion 32 is sewn together with the covering material 20 covering the pad body portion 21. The covering material 20 covering the locking pad portion 32 and the covering material 20 covering the pad body portion 21 are fixed to a resin plate member 33 disposed below the locking pad portion 32 via a fabric holding member 29. The other end of the covering material 20 covering the locking pad portion 32 is fixed to the rear face of the locking pad portion 32.

As illustrated in FIG. 3, a fixture 71, to which a connector (a fixation connecting portion) 61 of a child safety seat 6 for ISOFIX is connected and fixed, is disposed behind the cover member 50 of the bezel member 5. The fixture 71 includes a coupling portion 711 extending in the right-left direction so as to be coupled with the connector 61 of the child safety seat 6, and a pair of leg portions (not shown) extending from both ends of the coupling portion 711 toward the rear side, and thus, the fixture 71 is formed in a U-shape. The pair of leg portions of the fixture 71 is joined to a coupling bracket 72 by welding or the like. The coupling bracket 72 is fastened and fixed to a floor F of the vehicle with bolts or the like.

At the time of fixing the child safety seat 6 for ISOFIX, the cover member 50 of the bezel member 5 is removed, and the connector 61 of the child safety seat 6 is inserted from the opening 511 of the frame body portion 51 of the bezel member 5. Then, the connector 61 of the child safety seat 6 is coupled with the coupling portion 711 of the fixture 71. Thus, the child safety seat 6 is fixed to the vehicle body (the floor F of the vehicle) via the fixture 71 and the coupling bracket 72.

Figure 6A:
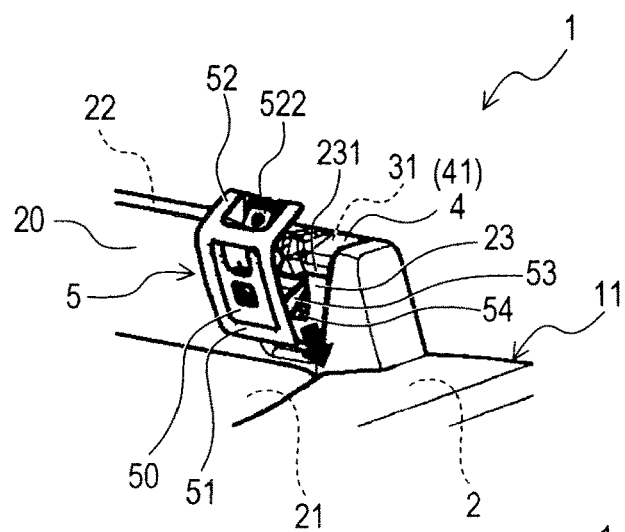
FIG. 6A is an explanatory view illustrating a state where a locking portion of the bezel member is locked to a rear face of a locking pad portion.

Next, an operation for attaching the bezel member 5 will be described. First, as illustrated in FIG. 6A, the locking portion 54 of the bezel member 5 is inserted to be disposed behind the locking pad portion 32 covered with the covering material 20. Then, the projecting lug portion 541 of the locking portion 54 of the bezel member 5 is engaged with the rear face of the locking pad portion 32 so as to be locked to the locking pad portion 32 from the rear side.

Figure 6B:
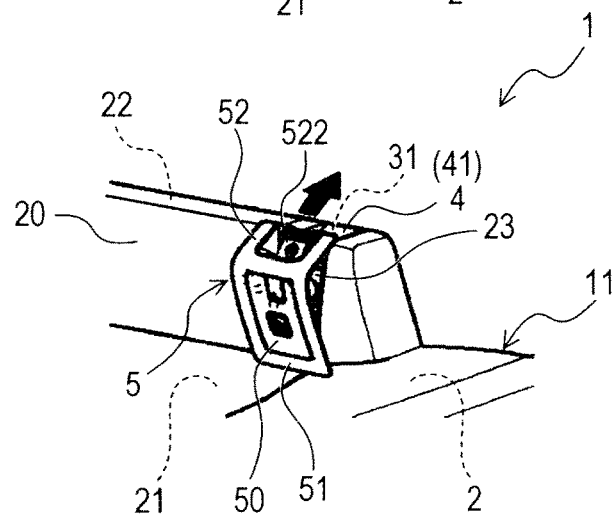
FIG. 6B is an explanatory view illustrating a state where an attachment locking lug portion of the bezel member is locked to a rear face of an attachment pad portion.

Subsequently, as illustrated in FIG. 6B, in a state where the locking portion 54 of the bezel member 5 is locked to the locking pad portion 32, the protrusion 411 of the attachment portion 41 of the attachment bracket 4 is passed through the locking hole 524 of the attachment extension portion 52 of the bezel member 5, and the attachment locking lug portion 523 is engaged with a bottom face of the attachment portion 41 of the attachment bracket 4 so as to be locked. Further, the attachment locking lug portion 523 is pushed into the attachment pad portion 31 covered with the covering material so as to be locked.

Figure 6C:
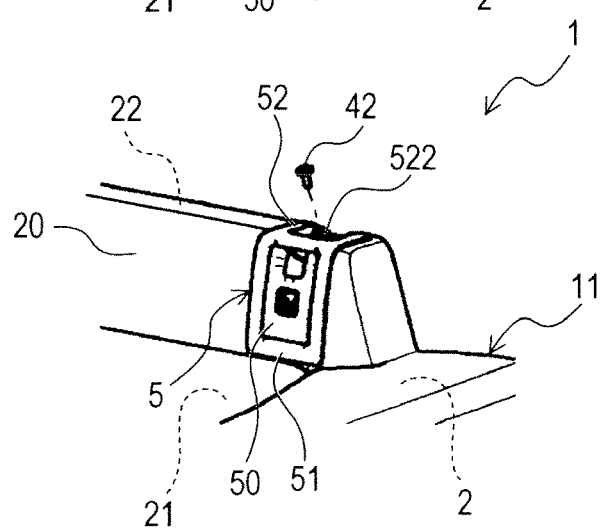
FIG. 6C is an explanatory view illustrating a state where an attaching portion of the bezel member is fastened and fixed to an attachment portion of an attachment bracket with a fastening screw.

Subsequently, as illustrated in FIG. 6C, the attaching portion 522 of the bezel member 5 temporarily fixed (positioned) is fastened and fixed to the attachment portion 41 of the attachment bracket 4 with the fastening screw 42. Thus, the attachment of the bezel member 5 is completed.

Next operations and effects of the vehicle seat 1 of the present embodiment will be described. In the vehicle seat 1 of the present embodiment, the attaching portion 522 of the bezel member 5 is attached, with the fastening screw 42, to the attachment portion 41 of the attachment bracket 4 provided integrally with the attachment pad portion 31 of the cushion pad 2, the bezel member 5 having the opening 511 configured such that the connector 61 of the child safety seat 6 for ISOFIX is inserted into the opening 511. That is, the bezel member 5 is attached to the attachment pad portion 31 of the cushion pad 2, which has been formed integrally with the attachment bracket 4. Accordingly, for example, it is not necessary to form the seat pad during the attachment of the bezel member, unlike the related art, and thus, the bezel member 5 can be easily attached. Thus, with a simple structure, the attachment of the bezel member 5 in the vehicle seat 1 is easily performed.

Further, the first wire member 311, to which the attachment bracket 4 is attached, is embedded in the attachment pad portion 31. Accordingly, it is possible to easily attach the bezel member 5 to the attachment pad portion 31 in which the first wire member 311 is embedded. Further, it is possible to sufficiently fix the bezel member 5 to the attachment bracket 4 attached to the first wire member 311.

Further, the bezel member 5 includes the frame body portion 51 having the opening 511, and the attachment extension portion 52 extending from the frame body portion 51 toward the cushion pad 2 and including the attaching portion 522. Therefore, the bezel member 5 is further easily attached to the seat cushion 11.

Further, in the bezel member 5, the attachment extension portion 52 has the recessed portion 521 that is recessed toward the attachment bracket 4, and the attaching portion 522 is provided in the recessed portion 521. Accordingly, a fixing portion (e.g., the fastening screw 42 or the like) provided to fix the attaching portion 522 of the bezel member 5 to the attachment portion 41 of the attachment bracket 4 can be prevented from being exposed to the outside (in other words, a fixing portion, at which the attaching portion 522 of the bezel member 5 and the attachment portion 41 of the attachment bracket 4 are fixed, can be prevented from being exposed to the outside). This makes it possible to improve the external appearance and the design property.

Further, in the bezel member 5, the attachment extension portion 52 includes the attachment locking lug portion 523 that is locked to the attachment pad portion 31. In the present embodiment, the attachment locking lug portion 523 is also locked to the attachment portion 41 of the attachment bracket 4 provided integrally with the attachment pad portion 31. Therefore, the positioning of the bezel member 5 is easily performed, and the attachment of the bezel member 5 to the seat cushion 11 is further easily performed.

Further, the attachment portion 41 of the attachment bracket 4 is covered with the covering material 20 that covers the cushion pad 2. This accordingly makes it possible to prevent the attachment portion 41 of the attachment bracket 4 from being exposed to the outside. This makes it possible to improve the external appearance and the design property.

Further, the covering material 20 covering the attachment portion 41 of the attachment bracket 4 is fixed, with the fastening screw 42, to the attachment portion 41 of the attachment bracket 4 together with the attaching portion 522 of the bezel member 5. Accordingly, it is possible to cover the attachment portion 41 of the attachment bracket 4 with the covering material 20 and to sufficiently fix the covering material 20 to the attachment portion 41 of the attachment bracket 4.

Further, the cushion pad 2 includes the pad body portion 21, and the pad projecting portion 22 projecting from the pad body portion 21 toward the seatback 12 that supports the back of the occupant, and the through-hole 23 and the attachment pad portion 31 are provided in the pad projecting portion 22. Therefore, the bezel member 5 is easily attached to the seat cushion 11.

Further, the attaching portion 522 of the bezel member 5 and the attachment portion 41 of the attachment bracket 4, which are fixed with the fastening screw 42, are covered by the seatback 12. Accordingly, the fixing portion provided to fix the attaching portion 522 of the bezel member 5 to the attachment portion 41 of the attachment bracket 4 can be prevented from being exposed to the outside. This makes it possible to improve the external appearance and the design property.

Further, in the vehicle seat 1 of the present embodiment, the locking portion 54 of the bezel member 5 is locked to the locking pad portion 32, of the cushion pad 2, in which the second wire member 321 is embedded, the bezel member 5 having the opening 511 configured such that the connector 61 of the child safety seat 6 for ISOFIX is inserted into the opening 511. That is, the bezel member 5 is attached to the locking pad portion 32 of the cushion pad 2, which has been formed with the second wire member 321 being embedded therein. Therefore, for example, it is not necessary to form the seat pad during the attachment of the frame member, unlike the related art, and thus, the bezel member 5 is easily positioned and attached. Thus, with a simple structure, the attachment of the bezel member 5 in the vehicle seat 1 is easily performed.

Further, the bezel member 5 includes the frame body portion 51 having the opening 511, the locking extension portion 53 extending from the frame body portion 51 toward the cushion pad 2, and the locking portion 54 extending from the locking extension portion 53. Therefore, the bezel member 5 is further easily attached to the seat cushion 11.

Further, a part of the locking pad portion 32 is disposed between the frame body portion 51 and the locking portion 54 in the bezel member 5, and the locking portion 54 is locked to the locking pad portion 32 from the side (the rear side) opposite to the occupant sitting side. Accordingly, the locking portion 54 of the bezel member 5 can be sufficiently locked to the locking pad portion 32. Further, the positioning of the bezel member 5 with respect to the locking pad portion 32 is easily performed.

Further, a part of the locking pad portion 32 is sandwiched between the frame body portion 51 and the locking portion 54 in the bezel member 5. Accordingly, the positioning of the bezel member 5 with respect to the locking pad portion 32 is further easily performed.

Further, the locking portion 54 of the bezel member 5 includes the projecting lug portion 541 that projects toward the locking pad portion 32. Accordingly, the locking portion 54 of the bezel member 5 can be easily and sufficiently locked to the locking pad portion 32.

Further, the projecting lug portion 541 of the locking portion 54 of the bezel member 5 projects toward the second wire member 321 embedded in the locking pad portion 32. Accordingly, the locking portion 54 of the bezel member 5 can be further easily and sufficiently locked to the locking pad portion 32.

Further, a part of the locking pad portion 32 is covered with the covering material 20 that covers the cushion pad 2, and a part of the covering material 20 covering the locking pad portion 32 is disposed between the locking pad portion 32, and the frame body portion 51, the locking extension portion 53, and the locking portion 54 of the bezel member 5. Accordingly, the covering material 20 can prevent the locking pad portion 32 from being exposed to the outside, thereby making it possible to improve external appearance and a design property. Further, a part of the covering material 20 covering the locking pad portion 32 can be sufficiently held between the locking pad portion 32, and the frame body portion 51, the locking extension portion 53, and the locking portion 54 of the bezel member 5.

Further, the cushion pad 2 includes the pad body portion 21, and the pad projecting portion 22 projecting from the pad body portion 21 toward the seatback 12 that supports the back of the occupant, and the through-hole 23 and the locking pad portion 32 are provided in the pad projecting portion 22. Therefore, the bezel member 5 is easily attached to the seat cushion 11.

This disclosure is not limited to the above embodiment, and the disclosure may be implemented in various forms within a range that does not depart from the disclosure.

(1) In the above embodiment, the "vehicle seat" of this disclosure is applied to the vehicle seat 1 used for an automobile, but may be applied to a vehicle seat used for a vehicle other than an automobile, for example, a train, or may be applied to a seat used for other vehicles such as an aircraft and a vessel.

(2) In the above embodiment, the bezel member (the frame member) 5 is attached to the seat cushion 11, but the frame member may be attached to the seatback 12 or the like. That is, the through-hole, the attachment pad portion, the locking pad portion, and so on may be provided in a back pad or the like as a seat pad disposed inside the seatback 12.

(3) In the above embodiment, the fastening screw 42 is used as a fixing member provided to fix the attaching portion 522 of the bezel member 5 to the attachment portion 41 of the attachment bracket 4. However, the fixing member is not limited to this, and various screws, bolts, and the like may be used, for example.

(4) In the above embodiment, the locking portion 54 of the bezel member 5 is locked to the locking pad portion 32 of the cushion pad 2. However, the locking portion 54 of the bezel member 5 may be embedded in the locking pad portion 32 of the cushion pad 2, so as to be locked to the second wire member 321 provided integrally with the cushion pad 2.

(5) A function of one constituent in the above embodiment may be distributed to a plurality of constituents or functions of a plurality of constituents may be integrated such that one constituent has the functions. Further, a part of the constituents in the above embodiment may be omitted. Further, at least a part of the constituents in the above embodiment may be added to or replaced by another constituent in the above embodiment. Various modifications may be made to the above embodiment within the scope of the disclosure.

What is claimed is:

1. A vehicle seat comprising:
   a seat pad configured to support an occupant, the seat pad having a through-hole provided so as to extend through the seat pad in a direction from an occupant sitting side toward a side opposite to the occupant sitting side; and
   a frame member attached to an opening end of the through-hole on the occupant sitting side, the frame member having an opening configured such that a fixation connecting portion of a child safety seat is inserted into the opening, wherein
   the frame member is provided with an attaching portion attached to the seat pad,
   the seat pad includes an attachment pad portion provided integrally with an attachment member including an attachment portion to which the attaching portion of the frame member is attached, the attachment pad portion constituting a part of an inner wall surface of the through-hole,
   the attachment portion of the attachment member is disposed between the attachment pad portion and the attaching portion of the frame member, and
   the attaching portion of the frame member is fixed to the attachment portion of the attachment member with a fixing member.

2. The vehicle seat according to claim 1, wherein a wire member to which the attachment member is attached is embedded in the attachment pad portion.

3. The vehicle seat according to claim 1, wherein the frame member includes a frame body portion having the opening, and an attachment extension portion extending from the frame body portion toward the seat pad, the attachment extension portion including the attaching portion.

4. The vehicle seat according to claim 3, wherein in the frame member, the attachment extension portion has a recessed portion that is recessed toward the attachment member, and the attaching portion is provided in the recessed portion.

5. The vehicle seat according to claim 3, wherein in the frame member, the attachment extension portion includes an attachment locking portion locked to the attachment pad portion.

6. The vehicle seat according to claim 1, wherein the attachment portion of the attachment member is covered with a covering material covering the seat pad.

7. The vehicle seat according to claim 6, wherein the covering material covering the attachment portion of the attachment member is fixed, with the fixing member, to the attachment portion of the attachment member together with the attaching portion of the frame member.

8. The vehicle seat according to claim 1, wherein the seat pad is a cushion pad disposed inside a seat cushion configured to support buttocks of the occupant.

9. The vehicle seat according to claim 8, wherein:
   the cushion pad includes a pad body portion, and a pad projecting portion projecting from the pad body portion toward a seatback configured to support a back of the occupant; and
   the through-hole and the attachment pad portion are provided in the pad projecting portion.

10. The vehicle seat according to claim 9, wherein the attaching portion of the frame member and the attachment portion of the attachment member, which are fixed with the fixing member, are covered by the seatback.

11. A vehicle seat comprising:
    a seat pad configured to support an occupant, the seat pad having a through-hole provided so as to extend through the seat pad in a direction from an occupant sitting side toward a side opposite to the occupant sitting side; and
    a frame member attached to an opening end of the through-hole on the occupant sitting side, the frame member having an opening configured such that a fixation connecting portion of a child safety seat is inserted into the opening, wherein
    the frame member is provided with an attaching portion attached to the seat pad,
    the seat pad includes an attachment pad portion provided integrally with an attachment member including an attachment portion to which the attaching portion of the frame member is attached, the attachment pad portion constituting a part of an inner wall surface of the through-hole,
    a wire member to which the attachment member is attached is embedded in the attachment pad portion, and
    the attaching portion of the frame member is fixed to the attachment portion of the attachment member with a fixing member.

12. A vehicle seat comprising:
    a seat pad configured to support an occupant, the seat pad having a through-hole provided so as to extend through the seat pad in a direction from an occupant sitting side toward a side opposite to the occupant sitting side; and
    a frame member attached to an opening end of the through-hole on the occupant sitting side, the frame member having an opening configured such that a fixation connecting portion of a child safety seat is inserted into the opening, wherein
    the frame member is provided with an attaching portion attached to the seat pad,
    the seat pad includes an attachment pad portion provided integrally with an attachment member including an attachment portion to which the attaching portion of the frame member is attached, the attachment pad portion constituting a part of an inner wall surface of the through-hole, the attaching portion of the frame member is fixed to the attachment portion of the attachment member with a fixing member, and the attachment portion of the attachment member is covered with a covering material covering the seat pad.

* * * * *